US012470013B2

(12) United States Patent
Chvala

(10) Patent No.: US 12,470,013 B2
(45) Date of Patent: Nov. 11, 2025

(54) ELECTRICAL TERMINAL CONNECTOR WITH ROTATABLE MOUNTING FEATURES

(71) Applicant: Carlisle Interconnect Technologies, Inc., St. Augustine, FL (US)

(72) Inventor: Joseph W. Chvala, St. Augustine, FL (US)

(73) Assignee: Amphenol Cable and Interconnect Technologies, Inc., St. Augustine, FL (US)

( * ) Notice: Subject to any disclaimer, the term of this patent is extended or adjusted under 35 U.S.C. 154(b) by 230 days.

(21) Appl. No.: 18/340,348

(22) Filed: Jun. 23, 2023

(65) Prior Publication Data

US 2024/0429646 A1 Dec. 26, 2024

(51) Int. Cl.
*H01R 13/52* (2006.01)
*H01R 13/533* (2006.01)
(Continued)

(52) U.S. Cl.
CPC ....... *H01R 13/5202* (2013.01); *H01R 13/533* (2013.01); *H01R 13/5808* (2013.01); *H01R 43/04* (2013.01); *H01R 2201/26* (2013.01)

(58) Field of Classification Search
CPC .............. H01R 13/5202; H01R 13/533; H01R 13/5808; H01R 43/04; H01R 2201/26;
(Continued)

(56) References Cited

U.S. PATENT DOCUMENTS 1,156,710 A 10/1915 Rowe
D90,584 S 8/1933 Koch
(Continued)

FOREIGN PATENT DOCUMENTS

DE 1465155 A1 12/1968
DE 9215578 U1 12/1992
(Continued)

OTHER PUBLICATIONS

Pimentel Ferreira, J., International Search Report, Sep. 26, 2024, 4 pages, Patent Cooperation Treaty.
Installation Instruction 400LR Feb. 1995.

*Primary Examiner* — Briggitte R. Hammond
(74) *Attorney, Agent, or Firm* — Wood Herron & Evans LLP

(57) ABSTRACT

An electrical connector for coupling with a terminal conductive structure includes a terminal assembly that mates with a separate socket assembly in a rotational interface. The terminal assembly terminates in a conductive element, such as a tongue, configured for coupling with a conductive structure, such as a terminal block or power strip, for example. The separate socket assembly has a portion for receiving a conductor of a cable. The terminal assembly includes a pin that fits into a socket portion of the socket assembly for mating the terminal and socket assemblies to form a rotational interface. To secure the assemblies together an outer groove is formed on an outer surface of the terminal assembly and an inner groove is formed in an inner surface of the socket portion. An expandable ring is positioned in the outer groove and is compressed to fit inside of the outer groove for mating the terminal assembly pin and the socket portion. When the assemblies are mated, the grooves align for allowing the ring to decompress into at least part of the inner groove to secure the mated terminal and socket assemblies together in the rotational interface.

19 Claims, 8 Drawing Sheets

(51) Int. Cl.
*H01R 13/58* (2006.01)
*H01R 43/04* (2006.01)

(58) Field of Classification Search
CPC ...... H01R 13/20; H01R 13/6277; H01R 4/20; H01R 13/5219; H01R 11/05
See application file for complete search history.

(56) References Cited

U.S. PATENT DOCUMENTS

| | | | | |
|---|---|---|---|---|
| 1,970,635 | A | 8/1934 | Szekely | |
| 1,989,718 | A | 2/1935 | John | |
| 2,379,567 | A | 7/1945 | Buchanan | |
| 2,385,792 | A | 10/1945 | Carlson | |
| 2,410,321 | A | 10/1946 | Watts | |
| 2,480,280 | A | 8/1949 | Bergan | |
| 2,551,299 | A | 5/1951 | Sowa | |
| 2,554,813 | A | 5/1951 | Buchanan | |
| RE23,688 | E | 7/1953 | Watts | |
| 2,654,873 | A | 10/1953 | Swengel | |
| 2,671,889 | A | 3/1954 | Vickery | |
| 2,681,439 | A | 6/1954 | Carlson | |
| 2,681,440 | A | 6/1954 | Swengel | |
| 2,721,986 | A | 10/1955 | Badeau | |
| 2,724,098 | A | 11/1955 | Bergan | |
| 2,735,997 | A | 2/1956 | Peterson | |
| 2,769,965 | A | 11/1956 | Nelson | |
| 2,795,769 | A | 6/1957 | Wells | |
| 2,799,721 | A | 7/1957 | Floyd, Jr. | |
| 2,802,257 | A | 8/1957 | Holtzapple | |
| 2,806,214 | A | 9/1957 | Forney, Jr. | |
| 2,806,215 | A | 9/1957 | Redslob | |
| 2,807,792 | A | 9/1957 | O'Keefe | |
| 2,815,497 | A | 12/1957 | Redslob | |
| 2,855,581 | A | 10/1958 | Freedom | |
| D185,743 | S | 7/1959 | Edwards | |
| D188,105 | S | 6/1960 | Cobaugh | |
| 2,957,226 | A | 10/1960 | Bern | |
| 2,974,400 | A | 3/1961 | Sowa | |
| 3,098,688 | A | 7/1963 | Martin | |
| 3,123,663 | A | 3/1964 | Muldoon | |
| 3,356,987 | A | 12/1967 | Francis | |
| 3,496,626 | A | 2/1970 | Ullman | |
| 3,512,123 | A | 5/1970 | Costello | |
| 3,549,786 | A | 12/1970 | Kuo | |
| 3,573,721 | A | 4/1971 | Teagno et al. | |
| 3,594,713 | A | 7/1971 | Thoman | |
| 3,633,153 | A | 1/1972 | Ahmed | |
| 3,695,642 | A | 10/1972 | DeWoody | |
| 3,717,839 | A | 2/1973 | Aldridge | |
| 3,728,665 | A | 4/1973 | Frey | |
| 3,732,718 | A | 5/1973 | Barberio et al. | |
| 3,735,331 | A | 5/1973 | O'Donnell et al. | |
| 3,757,031 | A | 9/1973 | Izraeli | |
| 3,763,555 | A | 10/1973 | Van de Kerkhof | |
| D230,025 | S | 1/1974 | Hoffman | |
| 3,812,448 | A | 5/1974 | Haitmanek | |
| 3,828,298 | A | 8/1974 | Schumacher | |
| 3,831,132 | A | 8/1974 | Bowden, Jr. et al. | |
| D233,438 | S | 10/1974 | Burner | |
| 3,895,851 | A | 7/1975 | Bolton et al. | |
| 3,931,726 | A | 1/1976 | Grubb | |
| 3,955,044 | A | 5/1976 | Hoffman et al. | |
| 4,031,613 | A | 6/1977 | Brown et al. | |
| 4,073,744 | A | 2/1978 | Eliades et al. | |
| 4,114,253 | A | 9/1978 | Loomis et al. | |
| 4,118,097 | A | 10/1978 | Budnick | |
| 4,139,937 | A | 2/1979 | L'Homme | |
| 4,142,771 | A | 3/1979 | Barnes et al. | |
| 4,150,866 | A | 4/1979 | Snyder, Jr. et al. | |
| 4,210,379 | A | 7/1980 | Vachhani et al. | |
| 4,283,597 | A | 8/1981 | Cooper, Jr. | |
| 4,388,523 | A | 6/1983 | Keep, Jr. et al. | |
| 4,426,772 | A | 1/1984 | Collier et al. | |
| 4,478,479 | A | 10/1984 | Cherry et al. | |
| 4,557,048 | A | 12/1985 | Cordeiro | |
| 4,604,890 | A | 8/1986 | Martin | |
| 4,605,279 | A | 8/1986 | Mixon, Jr. | |
| 4,611,872 | A | 9/1986 | Ito et al. | |
| 4,648,673 | A | 3/1987 | Endo et al. | |
| 4,679,888 | A | 7/1987 | Williams | |
| 4,684,191 | A | 8/1987 | Feher et al. | |
| 4,693,688 | A | 9/1987 | Cembruch et al. | |
| 4,754,536 | A | 7/1988 | Goyert et al. | |
| 4,795,380 | A | 1/1989 | Frantz | |
| 4,813,893 | A * | 3/1989 | Sindlinger ............... | H01R 4/20 439/879 |
| 4,821,383 | A | 4/1989 | Grosklos et al. | |
| 4,828,351 | A | 5/1989 | Beinhaur | |
| 4,828,516 | A | 5/1989 | Shaffer | |
| 4,845,589 | A | 7/1989 | Weidler et al. | |
| 4,861,290 | A | 8/1989 | Halmstad et al. | |
| 4,902,253 | A | 2/1990 | Schacht | |
| 4,959,988 | A | 10/1990 | Dassance et al. | |
| 4,979,291 | A | 12/1990 | Phillips et al. | |
| 4,983,133 | A | 1/1991 | Van Scyoc et al. | |
| 4,998,895 | A | 3/1991 | Forney et al. | |
| 5,095,599 | A | 3/1992 | Gloe et al. | |
| 5,127,255 | A | 7/1992 | Skotek | |
| 5,174,022 | A | 12/1992 | Phillips et al. | |
| 5,175,925 | A | 1/1993 | Grosklos et al. | |
| 5,188,544 | A | 2/1993 | Mukai | |
| 5,188,545 | A | 2/1993 | Hass et al. | |
| 5,203,724 | A | 4/1993 | Casey | |
| 5,288,242 | A | 2/1994 | Muzslay | |
| 5,288,245 | A | 2/1994 | Piana et al. | |
| 5,358,433 | A | 10/1994 | Dechanteloup et al. | |
| 5,418,331 | A | 5/1995 | Delalle | |
| 5,422,438 | A | 6/1995 | Lamome | |
| 5,499,448 | A | 3/1996 | Tournier et al. | |
| 5,499,934 | A | 3/1996 | Jacobsen et al. | |
| 5,514,836 | A | 5/1996 | Delalle et al. | |
| 5,620,338 | A | 4/1997 | Stephens et al. | |
| 5,745,982 | A | 5/1998 | Klinedinst | |
| 6,025,559 | A | 2/2000 | Simmons | |
| 6,152,784 | A | 11/2000 | Pyles | |
| 6,388,894 | B1 | 5/2002 | Paggi et al. | |
| 6,415,499 | B1 | 7/2002 | Holland et al. | |
| 6,558,208 | B2 | 5/2003 | Suzuki | |
| 6,570,094 | B2 | 5/2003 | King, Jr. | |
| 6,658,725 | B1 | 12/2003 | Liu | |
| 6,666,732 | B1 | 12/2003 | Endacott | |
| 6,670,555 | B2 | 12/2003 | Ota et al. | |
| 6,726,510 | B2 | 4/2004 | Norbert et al. | |
| 6,836,620 | B1 | 12/2004 | Bischoff | |
| 6,881,104 | B2 | 4/2005 | Suzuki et al. | |
| 6,883,229 | B2 | 4/2005 | Schuppert, Jr. | |
| 6,893,301 | B2 | 5/2005 | Kuwayama et al. | |
| 6,945,819 | B2 | 9/2005 | Laub et al. | |
| 7,081,027 | B2 | 7/2006 | Woodward | |
| 7,081,589 | B1 | 7/2006 | Advey et al. | |
| 7,168,159 | B2 | 1/2007 | Imai | |
| 7,210,958 | B1 | 5/2007 | Jacques et al. | |
| 7,256,348 | B1 | 8/2007 | Endacott | |
| 7,264,503 | B2 | 9/2007 | Montena | |
| 7,285,011 | B2 | 10/2007 | Hardy et al. | |
| 7,370,408 | B2 | 5/2008 | Deming et al. | |
| 7,494,388 | B2 | 2/2009 | Kakuta | |
| 7,527,523 | B2 | 5/2009 | Yohn et al. | |
| 7,537,494 | B1 | 5/2009 | Umlauf | |
| 7,538,274 | B2 | 5/2009 | Bertini et al. | |
| 7,575,485 | B2 * | 8/2009 | Waltz ..................... | H02G 7/056 439/783 |
| 7,786,383 | B2 | 8/2010 | Gumley | |
| 8,066,525 | B2 * | 11/2011 | Melni .................... | H01R 11/12 439/271 |
| 8,350,155 | B2 | 1/2013 | Kobayashi et al. | |
| 8,408,929 | B2 | 4/2013 | Solon | |
| 8,519,267 | B2 | 8/2013 | Peters et al. | |
| 8,622,772 | B2 | 1/2014 | Akuta | |
| 9,385,449 | B2 * | 7/2016 | Peters .................... | H01R 4/203 |
| 9,985,362 | B2 * | 5/2018 | Arenburg ................. | H01R 4/30 |
| 10,211,565 | B2 * | 2/2019 | Trimborn ................. | H01R 4/34 |
| 2002/0066588 | A1 | 6/2002 | King, Jr. | |
| 2005/0054245 | A1 | 3/2005 | Greaves | |

(56) References Cited

U.S. PATENT DOCUMENTS

| | | | |
|---|---|---|---|
| 2007/0054138 | A1 | 3/2007 | Lau et al. |
| 2007/0264873 | A1 | 11/2007 | Kakuta |
| 2008/0217055 | A1 | 9/2008 | Gumley |
| 2008/0252158 | A1 | 10/2008 | Yohn et al. |
| 2008/0307934 | A1 | 12/2008 | Coe |
| 2010/0147585 | A1 | 6/2010 | Kobayashi et al. |
| 2012/0133224 | A1 | 5/2012 | Grosskopf et al. |
| 2012/0252258 | A1 | 10/2012 | Solon |
| 2017/0117640 | A1 | 4/2017 | Arenburg et al. |

FOREIGN PATENT DOCUMENTS

| | | | | |
|---|---|---|---|---|
| DE | 19821630 | C1 | 9/1999 | |
| EP | 1395464 | A1 | 3/2004 | |
| EP | 1965464 | A1 | 9/2008 | |
| EP | 1869731 | B1 | 5/2012 | |
| EP | 2650972 | A1 | 10/2013 | |
| EP | 1443602 | B1 | 4/2016 | |
| JP | 2006101664 | A | 4/2006 | |
| JP | 2010151652 | A | 7/2010 | |
| WO | 2019179299 | A1 | 9/2019 | |
| WO | WO-2020099889 | A1 * | 5/2020 | .............. F16B 13/04 |

* cited by examiner

ELECTRICAL TERMINAL CONNECTOR WITH ROTATABLE MOUNTING FEATURES

FIELD OF THE INVENTION

This present invention relates generally to electrical connectors or terminal assemblies, and particularly to improving the performance and installation of such terminals.

BACKGROUND OF THE INVENTION

Electrical connectors or terminals for terminating a power cable connection or other electrical connection, such as to provide power or ground, are often connected side-by-side in harness assemblies to grounding studs, to power strips or on top of each other, such as on a terminal block or on a power strip. Such connections provide power and ground to circuitry and electronics of systems, vehicles, or other devices, such as aircraft. As may be appreciated, such cable installations will often present tight configurations to address space constraints in the aircraft. The phrases lug, terminal lug, and terminal connector will be used interchangeably in this application to refer to such terminal connectors.

Terminal connectors are connected to cables and electrical conductors that extend over significant lengths in an installation. To reduce the potential of damaging such terminal connections and harness assemblies and for good connections and conduction, it is important to make sure that, in the installation, the terminal connectors on the end of the cables are mounted in the proper orientation so that certain conductive surfaces have maximum contact. For example, if the terminal connector uses a flat tongue, the tongues need to be oriented so that they lie generally flat on a terminal block without significantly twisting the cables along their length. At the same time, the terminal connector must also maintain its environmental sealing capabilities. Such terminals in aircraft environments are exposed to moisture as well as possible dry and liquid contaminants that can cause performance and arcing issues. As such, when existing terminal solutions are fixed to an insulated conductor, they are often environmentally crimp sealed with the cable conductor and insulation layers and fixed in their orientation with respect to the cable.

Accordingly, in the use and installation of conventional terminal assemblies, the terminal connectors have to be positioned properly on the cable based on the endpoint installation orientations. If they are out of alignment at their ends in the installation, the cables will need to be twisted for proper alignment. While installers may estimate how the terminals might be oriented on the cable when they are attached, crimped and sealed, because the long assemblies have to be routed through tight confines with several bends, it is difficult to do so. As such, cables may need to be twisted, adding strain to the wire, when the terminal cable ends are finally fixed in position. Because of this dynamic, in some longer run cable installations, it is necessary to attach or crimp a terminal connector on only one end of the cable initially and then run and install the cable in place. With an end of the cable located and terminated at the appropriate grounding stud, power strip or terminal block, the other end terminal connector is then installed and secured in a proper orientation. This installation has to be performed in what is frequently a very confined space in an aircraft, making the termination process more difficult.

Accordingly, it is an objective of the invention to address proper cable installations and terminal connector orientations and to improve installation processes. It is further an objective to be able to work with properly terminated cables in an installation and to address a myriad of different installation scenarios and locations without adding strain to the terminated cables. Still further, it is an objective to improve the installation efficiency and limit the time spent in cramped installation areas, such as in an aircraft. The present invention addresses these objectives and various drawbacks in the prior art.

SUMMARY OF THE INVENTION

An electrical connector for coupling with a terminal conductive structure includes a terminal assembly that mates with a separate socket assembly in a rotational interface. The terminal assembly has a conductive body that terminates in a conductive element, such as a tongue, that is configured for coupling with a conductive structure, such as a terminal block or power strip, for example. The separate socket assembly has a conductive body with a portion that is configured for receiving a conductor of a cable. The socket assembly may be crimped or otherwise affixed to the cable. The terminal assembly includes a pin that fits into a socket portion of the socket assembly that is configured for receiving the pin for mating the terminal and socket assemblies. The pin and socket portion form a rotational interface for the mated terminal and socket assemblies. An outer groove is formed on an outer surface of the terminal assembly, generally between the pin and the tongue and an inner groove is formed in an inner surface of the socket. An expandable ring is positioned in the outer groove and is configured for being compressed to fit inside of the outer groove. When the ring is compressed, the terminal assembly pin may be pushed into the socket assembly. When the assemblies are mated, the inner groove and outer grooves are positioned to align for then allowing the ring to decompress from the outer groove into at least part of the inner groove to secure the mated terminal and socket assemblies together in the rotational interface the ring sits partially in each groove and the tongue may rotate with respect to a cable connected to the socket assembly.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF EMBODIMENTS OF THE INVENTION

Figure 1:
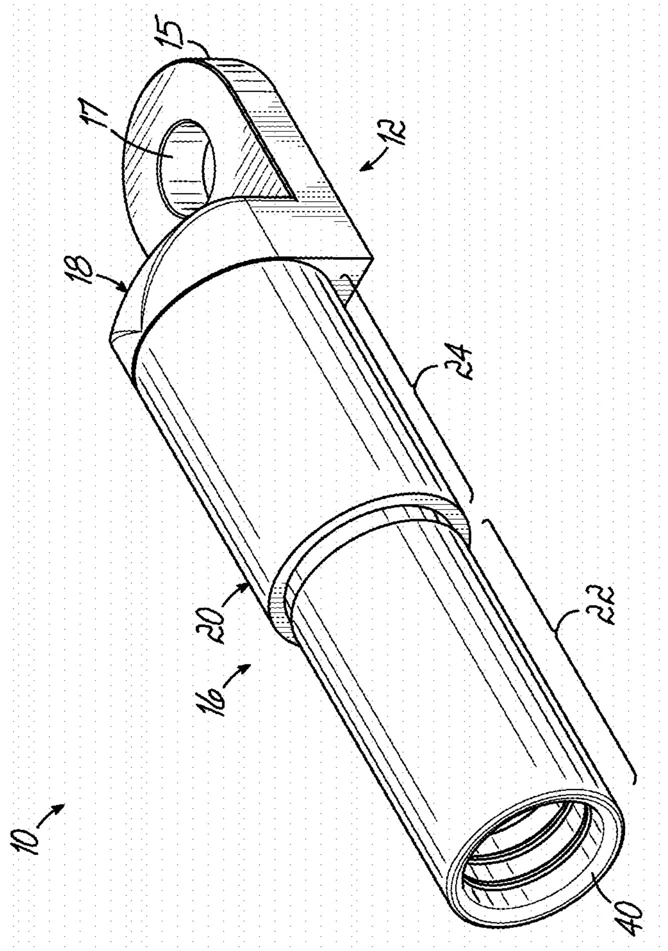
FIG. 1 is a front perspective view of an assembled terminal connector in accordance with an embodiment of the invention.

FIG. 1 illustrates an electrical terminal connector 10 in accordance with the present invention. The terminal connector 10 presents a terminal element, such as a lug or tongue 15, at the end of the connector 10 for connecting (for example) to grounding studs or to power strips, such as on a terminal block. The connector 10 may be used to terminate a plurality of cables at a common terminal connection. The tongue 15 includes an aperture or opening 17 to receive a post or other element from the terminal block. The shape of the lug may take on a form for being stacked onto other connectors at the common terminal connection point.

In accordance with one feature of the invention, the connector 10 provides a rotational element, in the form of a rotational tongue 15, to allow the connector to be rotated and positioned as desired prior to mounting. In that way, the connector may be secured to a wire or cable prior to installation while providing the ability to properly mount the connector regardless of the orientation or the termination point. The connector 10 is formed by the mating of two assemblies to provide proper electrical connections while providing rotation of the tongue 15. The connector includes a terminal assembly 12 having a conductive body that includes a pin portion or pin 14 and terminal tongue 15. The pin is mated or assembled with a socket assembly 16 having a conductive body with a wire receiving portion and a socket portion having an opening 34 to receive pin 14. The connector may be installed on a cable regardless of the end installation orientations. The cables do not have to be twisted during positioning and the end termination does not have to be completed at the termination point, where space constraints may make the task more difficult. Furthermore, the installed cables are not twisted under strain because the inventive terminal connector will rotate and relieve any strain.

Figure 2:
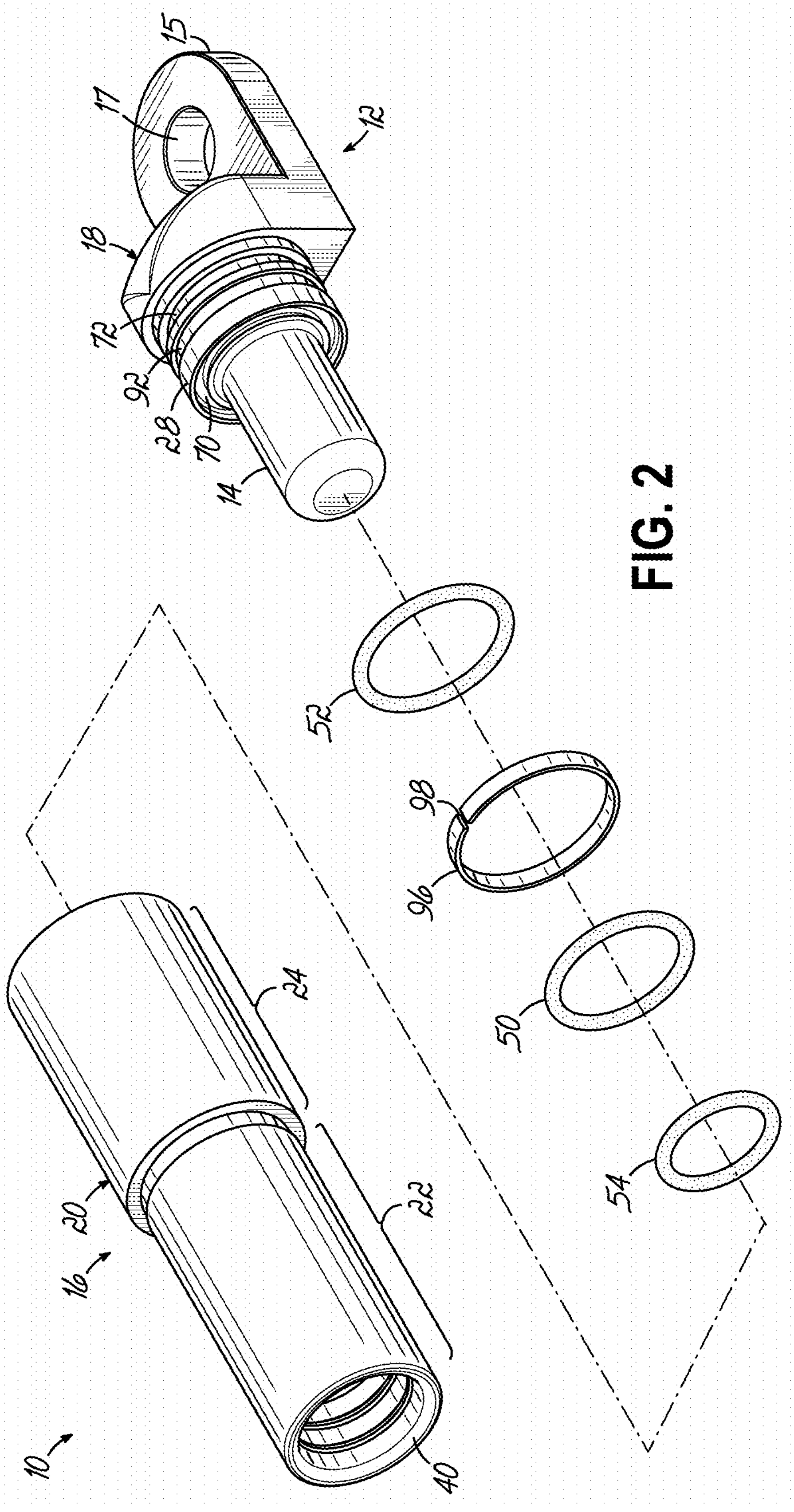
FIG. 2 is a front perspective view of a disassembled terminal connector in accordance with the embodiment of the invention of FIG. 1.
Figure 3:
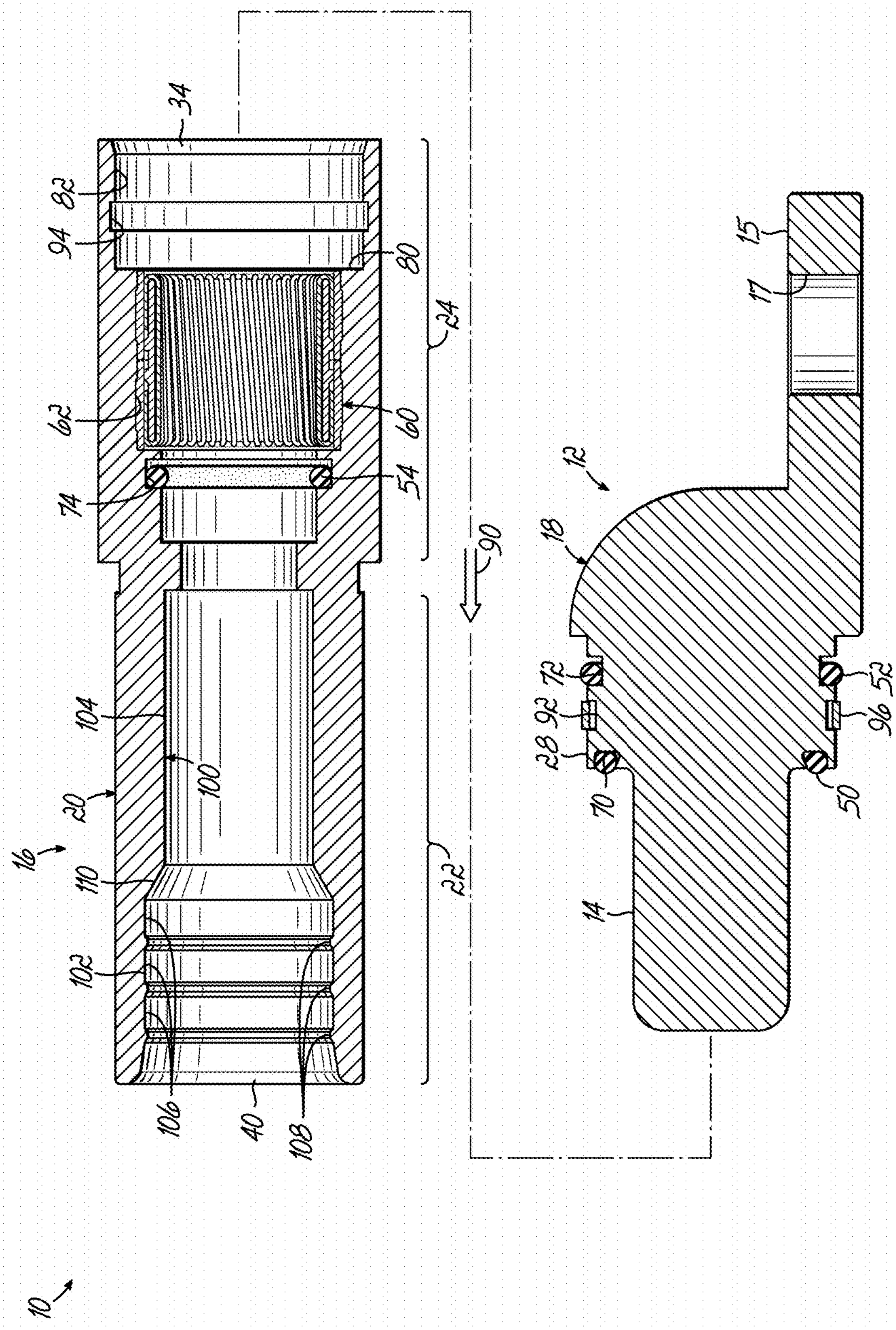
FIG. 3 is a side cross-sectional view of a disassembled terminal connector in accordance with the embodiment of the invention of FIG. 1.

Referring to FIGS. 2 and 3, each of the terminal assembly 12 and socket assembly 16 incorporate an electrically conductive body 18 and 20, respectively. The body 20 of the socket assembly 16 may be a unitary conductive body that includes a wire receiving portion. In the illustrated embodiment, that wire receiving portion is in the form of a crimp barrel or crimp portion 22 configured for being crimped upon receiving a conductor of a cable (see FIGS. 5-7). However, the wire receiving portion 22 might also be sized and configured for other attachment mechanisms, such as soldering. To that end, the end of the cable conductor might be received in the portion, with a suitable solder flow to ensure a good physical and electrical connection.

The body 20 also includes a socket portion 24 for receiving the pin 14 of the terminal assembly 12. The terminal assembly body 18 may be also be a unitary conductive body that is formed to make a pin portion or pin 14 and the tongue 15. The pin portion 14 is configured to fit within the socket portion 24 when the assemblies are mated to form the complete connector 10. The pin portion 14 has a round cross section that matches with a round cross section of the socket portion 24. For the discussion of the illustrated embodiment, the wire receiving portion will sometimes be referred to as a crimp portion, although the invention is not so limited.

Referring now to FIG. 2, the electrical connector 10 is shown in an exploded view with various of the components separated from each of the respective assemblies 12, 16. Pin 14 of the terminal assembly 12 is configured to be received into an opening 34 of the socket portion 24 of socket assembly 16 when the two assemblies are mated to form the electrical connector. Each of the terminal assembly 12 and socket assembly 16 are configured of a suitably conductive metal, such as copper and/or aluminum. The respective crimp portion 22 of the socket assembly 16 is appropriately formed for receiving the end of an electrical conductor, such as a center conductor of a cable.

Figure 5:
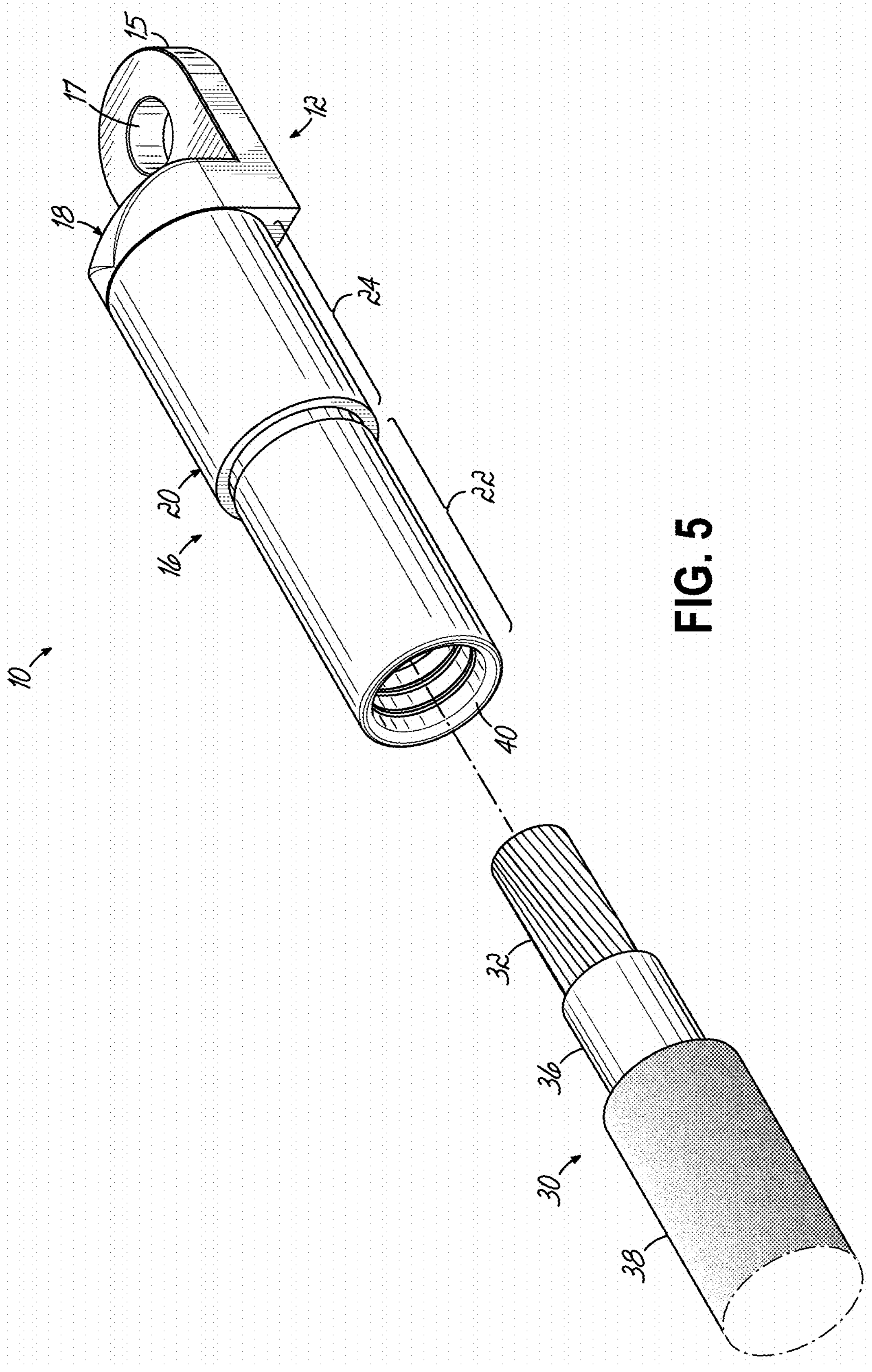
FIG. 5 is an exploded front perspective view of a an assembled terminal connector assembly implemented with a cable in accordance with the embodiment of the invention of FIG. 1.
Figure 6:
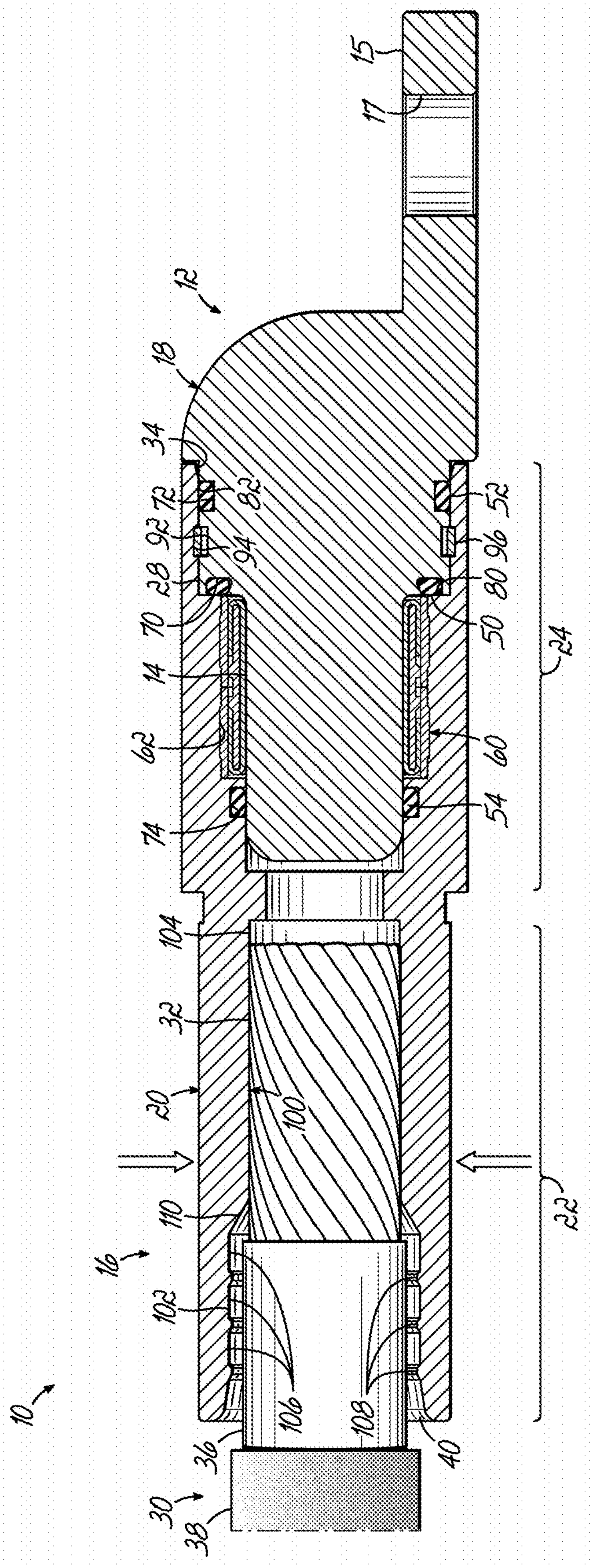
FIG. 6 is a side cross-sectional view of an assembled terminal connector implemented with a cable in accordance with the embodiment of the invention of FIG. 1.

Referring to FIGS. 5 and 6, the conductor is received into an opening 40 of the crimp portion 22 which opening 40 is appropriately formed for capturing and holding the end of a conductor when the crimp portion 22 is appropriately crimped, such as using a crimping tool. The terminal assembly 12 may have a solid unitary or integral construction that includes the tongue 15 and pin 14. In one embodiment, the terminal assembly may be a solid piece that is formed of aluminum or copper or some other conductive material. The connector 10 may be incorporated into a cable assembly 30 with a suitable wire or center conductor 32, as shown in FIG. 5. Center conductor 32, for example, might be a solid or stranded copper or aluminum surrounded by an insulation layer 36 and an outer insulating sheath 38. One or more other outer layers or insulation layers may also be used. In that way, any electrical or power signals handled by the center conductor are passed along the length of the cable assembly and through the electrical connector to the appropriate socket portion 24 and pin 14 and tongue 15 so that the signal passes to the termination structure or juncture.

Referring now to FIG. 2, the electrical connector 10 is shown in an exploded view with various of the components separated from each of the respective assemblies. The pin 14 of terminal assembly 12 is configured to be received into an opening 34 of the socket portion 24 of socket assembly 16 when the two assemblies are mated to form the electrical connector of the invention. The terminal assembly 12 further includes various sealing elements 50, 52 while the socket assembly includes a sealing element 54. To provide electrical engagement between the pin 14 of the terminal assembly and the socket assembly, a conductive insert 60 may be utilized.

Figure 4:
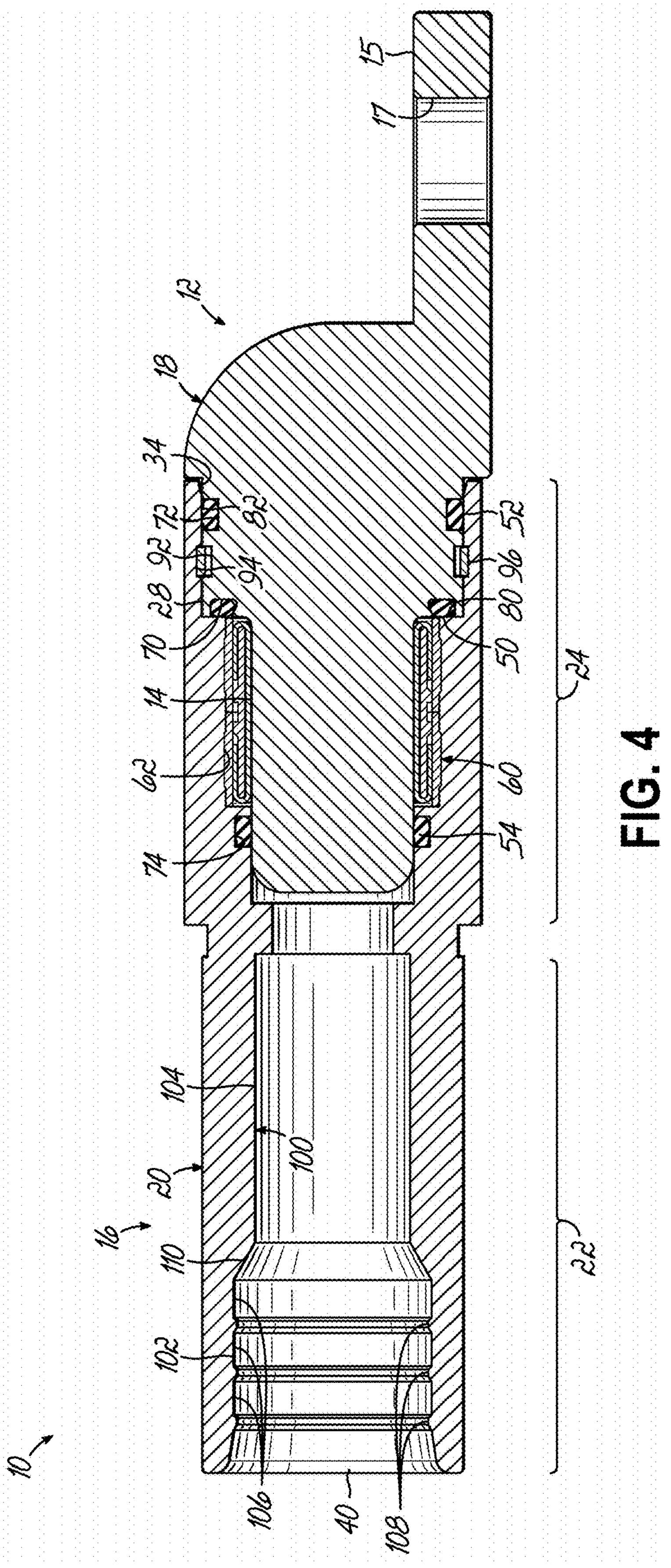
FIG. 4 is a side cross-sectional view of an assembled terminal connector in accordance with the embodiment of the invention of FIG. 1.

In one embodiment, the conductive insert 60 is a conductive spring made of a material such as beryllium copper that is configured to receive the pin 14 and is compressed between the internal wall 62 of the socket portion 24 as illustrated in FIG. 4. The insert is configured to expand radially into the socket assembly to receive the pin and be compressed by the pin 14 between the pin and the internal wall 62 for electrical conduction. Suitable conductive inserts might be utilized to improve conduction across the mated assemblies. The insert 60 insures good signal conduction between the pin 14 and the socket portion 24 of body 20 of the socket assembly 16 and through the connector 10.

Referring to FIGS. 3 and 4, when the terminal assembly 12 and socket assembly 16 are mated as shown in the cross-section of FIG. 4, the pin 14 is received in the opening 34 of the socket and engages the conductive insert 60 and compresses the insert between the internal wall 62 of the socket portion and the pin 14 for good electrical conduction across the connector. The terminal assembly 12 and socket assembly 16 incorporate the various seals 50, 52, 54 for sealing the pin 14 when it is mated with the socket assembly 16. To that end, in an outer surface 28 of the terminal portion 12, a plurality of grooves that are formed for acting as seal seats for the seals or as a locking groove for the locking features of the invention as discussed herein. The seals are ring seals for sealing the assemblies but still maintaining the rotational interface. A seal is positioned proximate the expandable ring and in the illustrated embodiment the a seal is positioned on either side of the expandable ring along the length of the connector when the assemblies 12, 16 are mated. Another seal is positioned at an end of socket portion to engage and end of the pin when the assemblies 12, 16 are mated.

Referring to FIG. 3, a groove 70 forms a seal seat for seal 50, such as an O-ring seal that engages a face surface of the socket portion and acts as a dampening seal. Another groove 72 forms at the seal seat for seal 52, such as an O-ring seal. The seal 50 is compressed against a face or ridge surface 80 formed internally in the socket portion 24 of the socket assembly 16. Whereas seal 52 seats against a surface 82 also formed internally in the socket portion 24 rearwardly of seal 50 when the terminal assembly and socket assembly are mated and locked together. In between the internal surfaces 80, 82 of the socket portion, another groove, in the form of a locking groove 94 is formed for locking the assemblies 12, 16 together as described. For additional sealing of the pin 14 and the socket portion 24 on the side of the insert 60 opposite seals 50, 52, the seal 54 is implemented. In the socket assembly 16, an internal groove 74 receives seal 54 as shown in FIG. 3. The seal is compressed when the socket portion receives pin 14 therein. Arrow 90 in FIG. 3 is indicative of the direction of travel of the terminal assembly as it mates with the socket assembly. FIG. 4 shows the connector in the complete or mated condition once the two assemblies 12, 16 are brought together.

In accordance with one aspect of the invention, the electrical connector incorporates a locking feature to lock the terminal assembly 12 into the socket assembly 16 once they are brought together or mated while still creating a rotating interface between the terminal assembly and tongue 15 in relation to the socket assembly 16 and any cable assembly 30 that is coupled thereto. Then, upon crimping or coupling the connector 10 to a cable assembly, the terminal assembly and tongue 15 may be adjusted as desired at an installation without concern for rotation or twisting of the cable assembly. To that end, each of the terminal assembly 12 and socket assembly 16 include locking grooves 92, 94 that cooperate with a locking ring 96 (See FIG. 2) for forming a rotational interface between the assemblies 12, 16. The groove 92 is formed on the outside of the body 18 of the terminal assembly 12, between the seal grooves 70, 72.

Figure 3A:
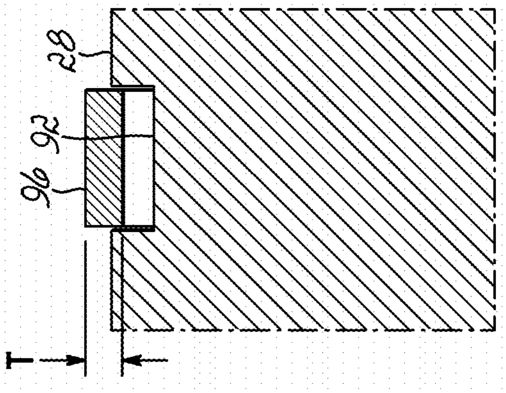
FIGS. 3A-3C are partial sectional views of the interface between assemblies of the terminal connector in accordance with the embodiment of the invention of FIG. 1.
Figure 3B:
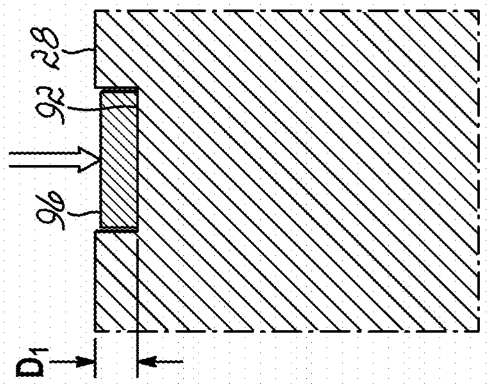
Figure 3C:
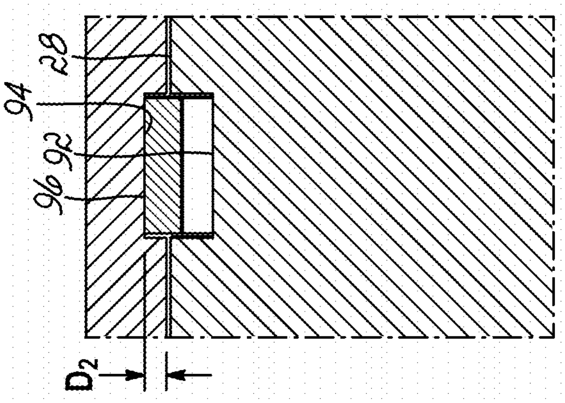

Referring to FIGS. 3A-3C, the locking ring 96 is dimensioned in width and thickness as well as its expanded outer diameter for interfacing with grooves 92, 94 and locking the assemblies. Specifically, the locking ring is an expandable ring made of a suitable metal that may be compressed in diameter to a smaller diameter within the groove 92 so the assemblies can be mated. To that end, the locking ring 96 may include a slit 98 or other break therein for allowing compression of the locking ring so that it can initially fit into the groove 92. Referring to FIG. 3A, the ring 96 is shown in the groove in its expanded or decompressed form. For mating the two assemblies, the ring may then be compressed.

In accordance with one feature of the invention, the groove 92 in the terminal assembly 12 has a depth $D_1$ that is deep enough and greater than the thickness T of the ring in order to receive the entire compressed locking ring 96 as shown in FIG. 3B, when the ring is compressed. In that way, the locking ring may be compressed fully into the groove 92 while the pin 14 of the terminal assembly is received into the socket portion 24 of the socket assembly 16. The locking ring may be formed of a suitable strong yet flexible material, such as a stainless steel alloy. With the ring 96 compressed as shown in FIG. 3B, the pin 14 and the grooved area of the terminal assembly which holds the compressed ring 96 may be inserted into the socket portion 24. Upon full mating of the terminal and socket assemblies, the pin 14 engages seal 54 and then the grooves 92, 94 are radially aligned with each other. Upon that radial alignment of the grooves with the mated assemblies, the compressed ring will now have the ability to expand or decompress radially outwardly. The ring moves into the internal groove 94 of the socket portion as shown in FIG. 3C.

In order to complete the locking feature of the invention with a rotational interface between the mated assemblies, the complementary groove 94 formed on the interior surface of the socket portion of the socket body 18 has a depth that is less than or more shallow than the depth of groove 92 and also less than or more shallow than the thickness T of the ring. Therefore, upon decompression, the ring 96 will only fit partially into the aligned groove 94 and a part of the thickness T of the ring will remain in the groove 92 as seen in FIG. 3C.

Referring to FIGS. 3C and 4, the ring 96 is shown in a decompressed state wherein the thickness T of the ring spans between the grooves 92, 94 and sits partially in both. In accordance with one embodiment, the groove 92 has a depth $D_1$ that is equal to or greater than the thickness T of the ring 96 so that the ring may be generally completely compressed into the groove 92 for mating purposes. The depth $D_2$ of the groove 94 may have a dimension less than $D_1$ that, for example, might be around 50% of the thickness T of the ring 96. In that way, once the terminal assembly is mated to the socket assembly, and the ring can decompress or expand into the groove 94, a portion of the thickness T of the ring is in the groove 94 while another portion still remains in groove 92, thus locking the assemblies into engagement longitudinal engagement. The assemblies are then prevented from being pulled apart by the expanded ring. The rotational interface created by such a coupling allows the tongue 15 to rotate while the socket portion is stationary with respect to a cable coupled with the connector.

Figure 7:
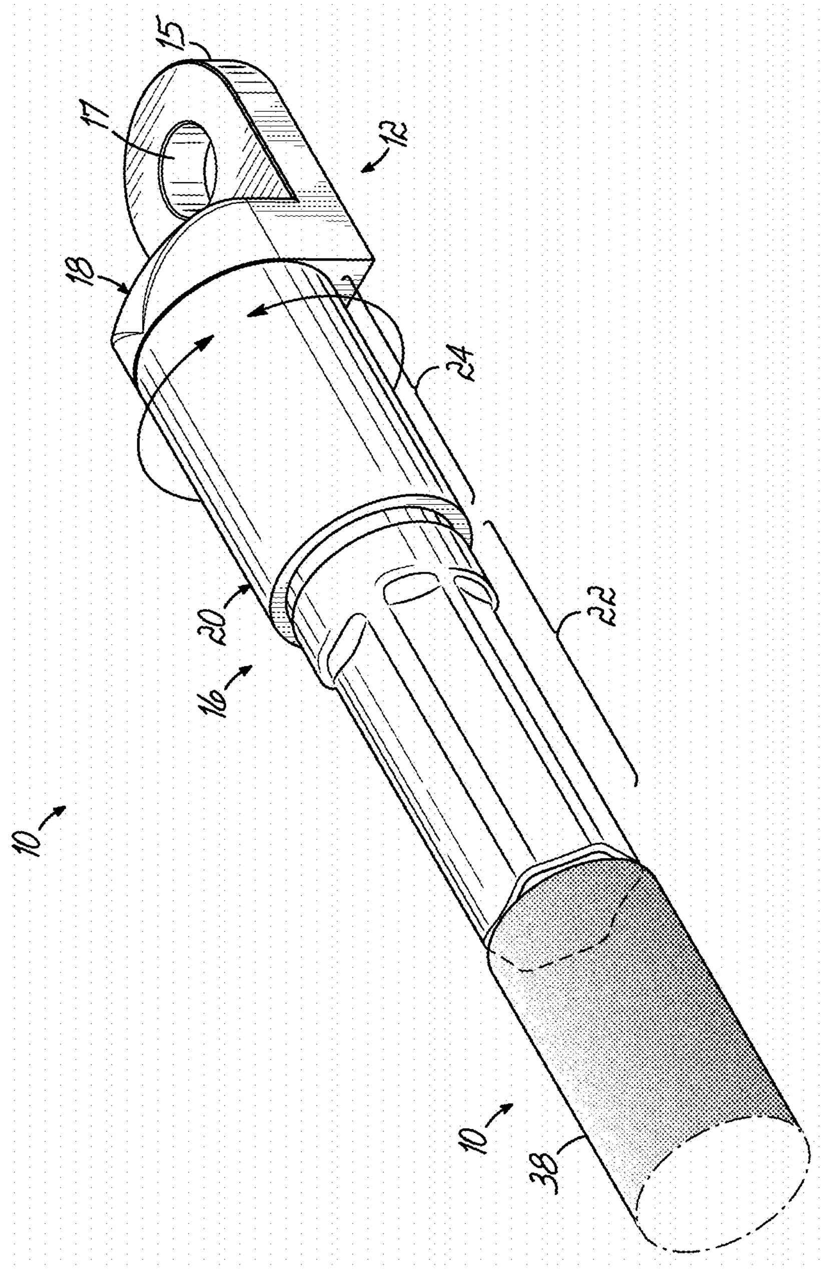
FIG. 7 is an exploded front perspective view of an assembled terminal connector assembly crimped with a cable in accordance with the embodiment of the invention of FIG. 1.

Referring to FIG. 5, a cable 30 may be inserted into the crimp portion 22 of the socket assembly 16. With reference to FIG. 3, the crimp portion 22 includes a continuous annular interior wall 100 forming the socket for receiving a cable. The socket has a seal portion or sealing portion 102 and a contact portion 104. When a conductor 32 is received by the contact portion 104, the insulation 36 of a cable may be received by the sealing portion 102. The sealing portion may be broken into a plurality of areas 106, as defined by integral seal rings 108 protruding radially inwardly from the surface 100 as illustrated in FIG. 3. The seal rings 108 have smaller diameters than the diameter of the areas 106. When the crimp portion is crimped, the rings bite into the insulation 36 for forming an environmental seal. A transition section 110 is positioned between the seal or sealing portion 102 and the contact portion 104. The transition section 110 guides the conductor 32 of the cable wire 32 from the larger sealing portion 102 into the contact portion 104, when the cable is inserted into the socket assembly 16. The assembly 16 is placed in a suitable crimping die, such as a modified hex crimping die, and crimped to make a cable with a crimp as shown in FIG. 7. The sealing rings 108 are squeezed into the insulation 36 to make a hydrostatic seal. The contact portion 104 is squeezed into the conductor 32 to give the cable a conductive electrical path between the conductor and tongue 15.

Suitable wire terminal crimp portion configurations for use with the present invention are disclosed in U.S. Pat. Nos. 8,519,267 and 9,385,499 entitled "TERMINAL/CONNECTOR HAVING INTEGRAL OXIDE BREAKER ELEMENT which patents are incorporated herein by reference in their entireties. Once the terminal 10 has been crimped to a cable, a suitable insulative sleeve might be placed over the crimp portion and appropriately shrunk or secured over the connector 10 and the cable.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. An electrical connector for coupling with a conductive structure, the electrical connector comprising:
- a terminal assembly having a conductive body terminating in a conductive element that is configured for coupling with a conductive structure;
- a socket assembly having a conductive body with a portion configured for receiving a conductor;
- the terminal assembly including a pin and the socket assembly including a socket portion configured for receiving the pin for mating the terminal and socket assemblies, the pin and socket portion forming a rotational interface for the mated terminal and socket assemblies;
- an outer groove formed on an outer surface of the terminal assembly;
- an inner groove formed in an inner surface of the socket assembly;
- an expandable ring positioned in the outer groove, the expandable ring configured for being compressed to fit inside of the outer groove for mating the terminal and socket assemblies;
- the inner groove and the outer groove positioned to align when the terminal and socket assemblies are mated for allowing the ring to decompress from the outer groove into at least part of the inner groove to secure the mated terminal and socket assemblies together in the rotational interface.

2. The electrical connector of claim 1 wherein the terminal assembly conductive element includes a tongue.

3. The electrical connector of claim 1 wherein the portion configured for receiving a conductor includes a crimp portion configured for being crimped around a conductor.

4. The electrical connector of claim 1 wherein the socket portion includes a conductive insert for receiving the pin, the conductive insert configured to expand to contact the pin and be compressed by the pin for electrical conduction with the socket portion.

5. The electrical connector of claim 1 wherein the inner groove has a depth less than a thickness of the expandable ring.

6. The electrical connector of claim 1 wherein the outer groove of the terminal assembly is positioned between the pin and conductive element.

7. The electrical connector of claim 1 further comprising at least one seal compressed between the socket portion and the pin when the terminal and socket assemblies are mated, the seal being positioned proximate the expandable ring.

8. The electrical connector of claim 7 wherein the seal is a ring seal surrounding the terminal assembly in the rotational interface of the mated terminal and socket assemblies.

9. The electrical connector of claim 7 further comprising a plurality of seals compressed between the socket portion and the pin when the terminal and socket assemblies are mated, at least one seal being positioned on either side of the expandable ring.

10. The electrical connector of claim 1 further comprising at least one seal positioned in the socket portion, the seal engaging the pin when terminal and socket assemblies are mated.

11. An electrical system comprising:
- a conductive structure having a post extending therefrom
- an electrical connector for electrically coupling with the conductive structure, the electrical connector including:
- a terminal assembly having a conductive body terminating in a conductive tongue having an aperture for receiving the conductive structure post for coupling with the conductive structure;
- a socket assembly having a conductive body with a portion configured for receiving a conductor;
- the terminal assembly including a pin and the socket assembly including a socket portion configured for receiving the pin for mating the terminal and socket assemblies, the pin and socket portion forming a rotational interface for the terminal and socket assemblies;
- an outer groove formed on an outer surface of the terminal assembly;
- an inner groove formed in an inner surface of the socket assembly;
- an expandable ring positioned in the outer groove, the expandable ring configured for being compressed to fit inside of the outer groove for mating the terminal and socket assemblies;
- the inner groove and the outer groove positioned to align when the terminal and socket assemblies are mated for allowing the ring to decompress from the outer groove into at least part of the inner groove to secure the mated terminal and socket assemblies together in the rotational interface.

12. The electrical system of claim 11 wherein the portion configured for receiving a conductor includes a crimp portion configured for being crimped around a conductor.

13. The electrical system of claim 11 wherein the socket portion includes a conductive insert for receiving the pin, the conductive insert configured to expand to contact the pin and be compressed by the pin for electrical conduction with the socket portion.

14. The electrical system of claim 11 wherein the outer groove has a depth less than a thickness of the expandable ring.

15. The electrical system of claim 11 wherein the outer groove of the terminal assembly is positioned between the pin and conductive element.

16. The electrical system of claim 11 further comprising at least one seal compressed between the socket portion and the pin when the terminal and socket assemblies are mated, the seal being positioned proximate the expandable ring.

17. The electrical system of claim 16 wherein the seal is a ring seal surrounding the terminal assembly in the rotational interface of the mated terminal and socket assemblies.

18. The electrical system of claim 11 further comprising a plurality of seals compressed between the socket portion and the pin when the terminal and socket assemblies are mated, at least one seal being positioned on either side of the expandable ring.

19. The electrical system of claim 11 further comprising at least one seal positioned in the socket portion, the seal engaging the pin when terminal and socket assemblies are mated.

* * * * *